(12) United States Patent
Geisler

(10) Patent No.: US 8,607,661 B2
(45) Date of Patent: Dec. 17, 2013

(54) MOUNTING AID AND MOUNTING METHOD

(75) Inventor: Hansjörg Geisler, Mayrhofen (AT)

(73) Assignee: Al-Ko Kober SE, Kötz (DE)

( * ) Notice: Subject to any disclaimer, the term of this patent is extended or adjusted under 35 U.S.C. 154(b) by 616 days.

(21) Appl. No.: 12/811,738

(22) PCT Filed: Dec. 19, 2008

(86) PCT No.: PCT/EP2008/010884
§ 371 (c)(1),
(2), (4) Date: Jul. 6, 2010

(87) PCT Pub. No.: WO2009/086897
PCT Pub. Date: Jul. 16, 2009

(65) Prior Publication Data
US 2010/0276235 A1 Nov. 4, 2010

(30) Foreign Application Priority Data
Jan. 7, 2008 (DE) ...................... 20 2008 000 220 U

(51) Int. Cl.
*G05G 5/06* (2006.01)
*F16D 65/14* (2006.01)

(52) U.S. Cl.
USPC ............. 74/527; 74/526; 74/502.4; 74/502.6; 188/196 B; 188/196 R; 188/2 D

(58) Field of Classification Search
USPC ............. 188/196 B, 196 R, 2 D; 74/501.5 R, 74/502.4–502.6, 526, 527
See application file for complete search history.

(56) References Cited

U.S. PATENT DOCUMENTS

| 5,086,662 | A | * | 2/1992 | Tayon et al. | ............. 74/501.5 R |
| 5,544,543 | A | * | 8/1996 | Hilgert et al. | ................. 74/502.4 |
| 6,023,992 | A | * | 2/2000 | Cameno | ................... 74/501.5 R |
| 6,131,482 | A | * | 10/2000 | Klippert et al. | ............. 74/502.6 |

FOREIGN PATENT DOCUMENTS

| DE | 196 18 422 A1 | 5/1997 |
| DE | 196 18 423 A1 | 5/1997 |
| DE | 202004005247 U1 | 9/2005 |
| DE | 202008000220 U1 | 7/2009 |
| FR | 2 710 302 | 3/1995 |

* cited by examiner

*Primary Examiner* — Robert A Siconolfi
*Assistant Examiner* — Mahbubur Rashid
(74) *Attorney, Agent, or Firm* — McGlew and Tuttle, P.C.

(57) ABSTRACT

A mounting aid and a mounting method is provided for a cable pull adjustor (1) which includes a pull element (S) which can be connected to at least one cable pull (5, and a driver which can be connected to the actuating member (4) of the braking device (3) and which is intended for releasably driving along the pull element (8, and also a clamping element (9) which acts between the driver (7) and the pull element (S). The mounting aid comprises a securing element (10) which locks the clamping element (9) in a partially clamped position and automatically releases it through a movement of the actuating number (4) and/or the pull element (S).

2 Claims, 8 Drawing Sheets

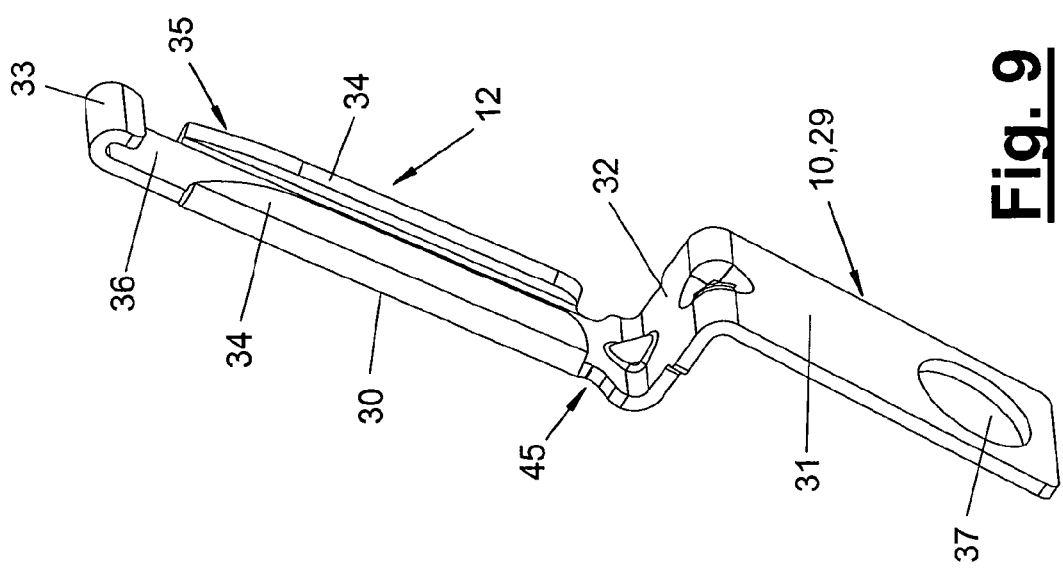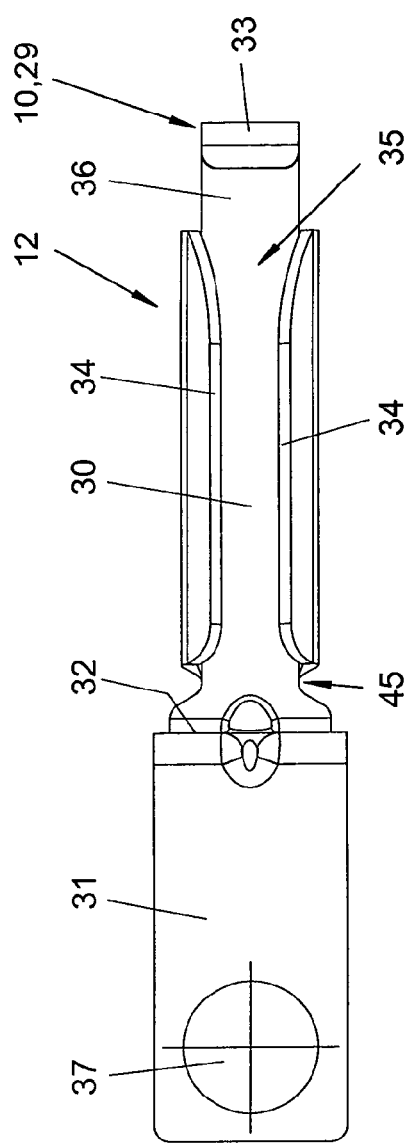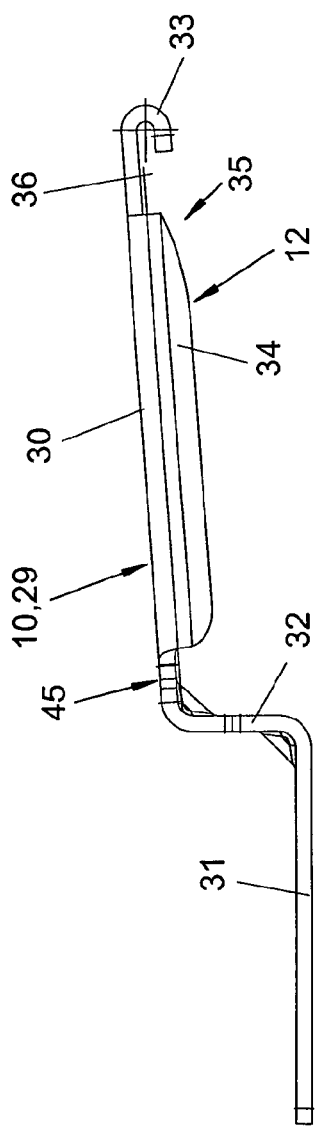

MOUNTING AID AND MOUNTING METHOD

CROSS REFERENCE TO RELATED APPLICATIONS

This application is a United States National Phase application of International Application PCT/EP2008/010884 and claims the benefit of priority under 35 U.S.C. §119 of German Patent Application DE 20 2008 000 220.6 filed Jan. 7, 2008, the entire contents of which are incorporated herein by reference.

FIELD OF THE INVENTION

The present invention pertains to an mounting aid for a sheathed cable adjusting means or a brake means equipped with such a sheathed cable adjusting means as well as to a mounting process.

BACKGROUND OF THE INVENTION

It is known in practice that brake means, especially hand brake means for vehicles, are equipped with a sheathed cable adjusting means, which automatically compensates the wear occurring on the wheel brakes and in the sheathed cables. The problem with the mounting of the brake means and especially the suspension is related to the temporary bridging over or stress relief of the sheathed cable adjusting means. It is known for this in practice that a pulling element, which belongs to the sheathed cable adjusting means and is connected to the sheathed cables, is locked in a bridged-over position by a peg or the like, which is a rigid part of the housing and which is released after mounting. Furthermore, the brake means and the sheathed cables must again be tensioned and adjusted after mounting. Both require a corresponding accessibility of the peg and of the mounting aid formed hereby.

SUMMARY OF THE INVENTION

The object of the present invention is to provide a better technique.

The present invention accomplishes this object with the mounting aid according to the invention. The mounting aid and the mounting process according to the invention have the advantage that the mounting aid can be released easily and simply after mounting and does not interfere with the further operation. The mounting aid does not need to be accessible from the outside for being released and also does not require the use of any tool. The mounting aid can be released automatically and reliably by operating an actuating member, especially a hand brake lever. As an alternative, the mounting aid can be released by a pulling motion directly on the pulling element or indirectly on the sheathed cable or on a transmission element. This technique is simple and easy to operate and avoids operating errors.

The sheathed cable adjusting means can be locked by the mounting aid in itself and will have a fixed length as a result between its connection and mounting sites at an actuating member and at a sheathed cable. It is not necessary to connect the sheathed cable adjusting means to an external support or peg, e.g., a frame or housing of a hand brake means. The fixation of the spacing can be eliminated and the tensioning and adjusting function of the sheathed cable adjusting means can be activated by releasing the mounting aid.

The mounting technique has, furthermore, the advantage that the actuating member can be brought into any desired suitable mounting position for mounting and can be operated for releasing the mounting aid only after completion of the mounting. The bridged-over or relieved sheathed cable adjusting means can also begin to function with the releasing of the mounting aid and ensure tensioning of the sheathed cables and a first adjustment of the brake means.

The mounting aid may have a pretensioned snap-in connection for locking the partly tensioned tensioning element, which can automatically open and spring back when the tensioning element is tensioned more by means of the actuating member and/or the pulling element. The additional tensioning path may be very small. A guide means may support the opening of the snap-in connection and may, in addition, ensure that the snap-in connection and the locking formed hereby will not automatically snap in again automatically in an undesired manner during the further operation. Neither accessibility of the mounting aid nor the use of a tool is necessary for releasing this snap-in connection. As an alternative to the snap-in connection with the guide means, the mounting aid may have a mechanical restricted guidance for releasing the locking mechanism. The mounting aid can again be locked deliberately when needed, e.g., for maintenance purposes.

Furthermore, measures for releasing the carrying means to facilitate the opening of the mounting aid are favorable. Coordination of the locking mechanism, especially the arrangement of an unprofiled area on the pulling element in a tensioned and mounted position, is especially advantageous. This increases the reliability during the opening of the mounting aid and offers independence from length tolerances and length coordinations of the sheathed cables as well as from the position of the actuating member.

The mounting aid being according to the invention may be used in a great variety of types of brake means and sheathed cable adjusting means.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a top view showing a securing strap of the mounting aid;

FIG. 8 is a side view showing a securing strap of the mounting aid;

FIG. 9 is a perspective view showing a securing strap of the mounting aid;

DESCRIPTION OF THE PREFERRED EMBODIMENTS

Figure 1:
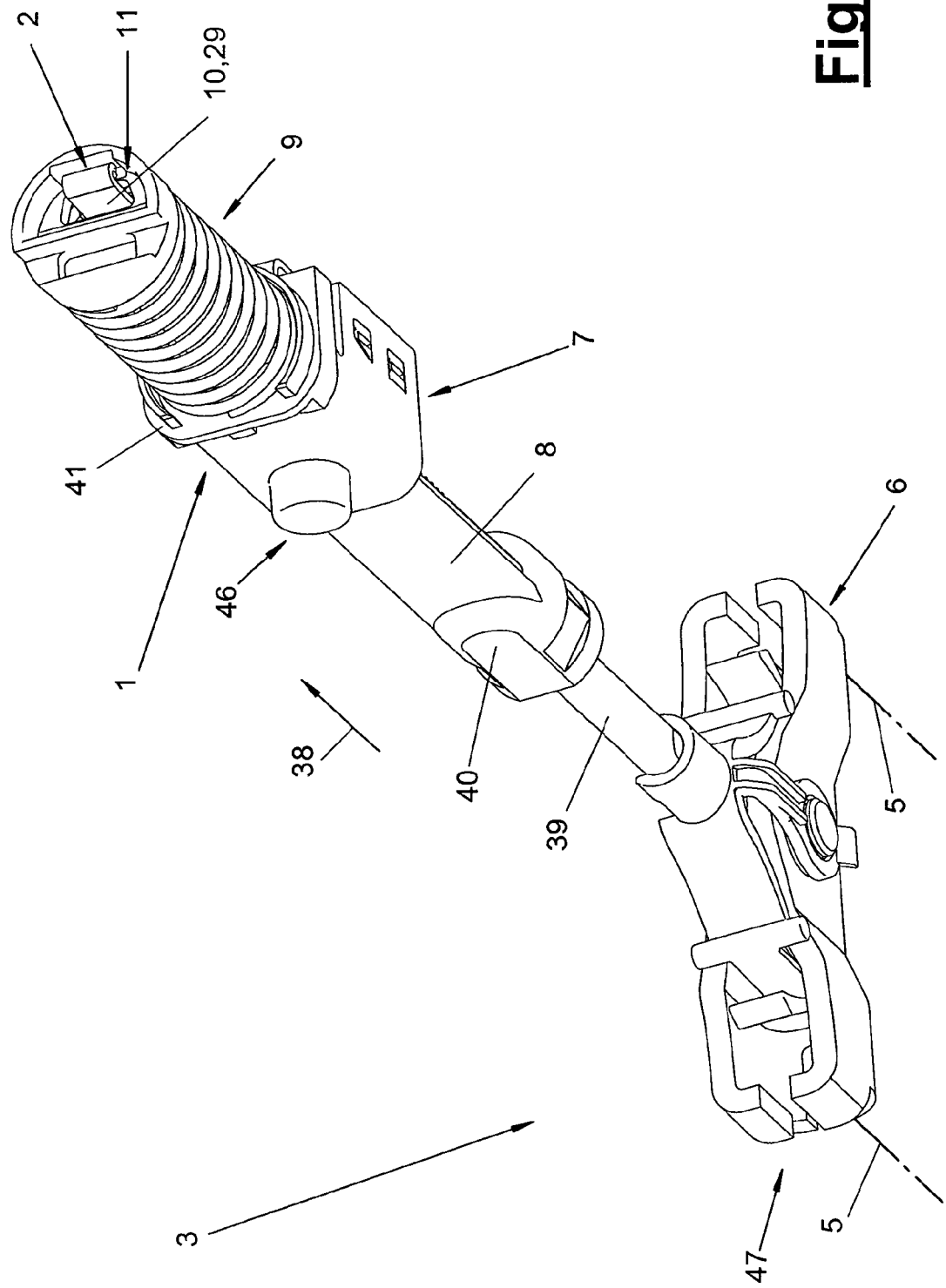
FIG. 1 is a perspective view of a sheathed cable adjusting means with a mounting aid and with further components of a brake means.

Referring to the drawings in particular, the present invention pertains to a mounting aid 2 for a sheathed cable adjusting means 1 as well as to a corresponding brake means 3. The present invention pertains, furthermore, to the sheathed cable adjusting means 1 equipped with a mounting aid 2 and also to a brake means 3, which has a mounting aid 2 and a sheathed cable adjusting means 1. The present invention pertains, furthermore, to a mounting process.

Figure 2:
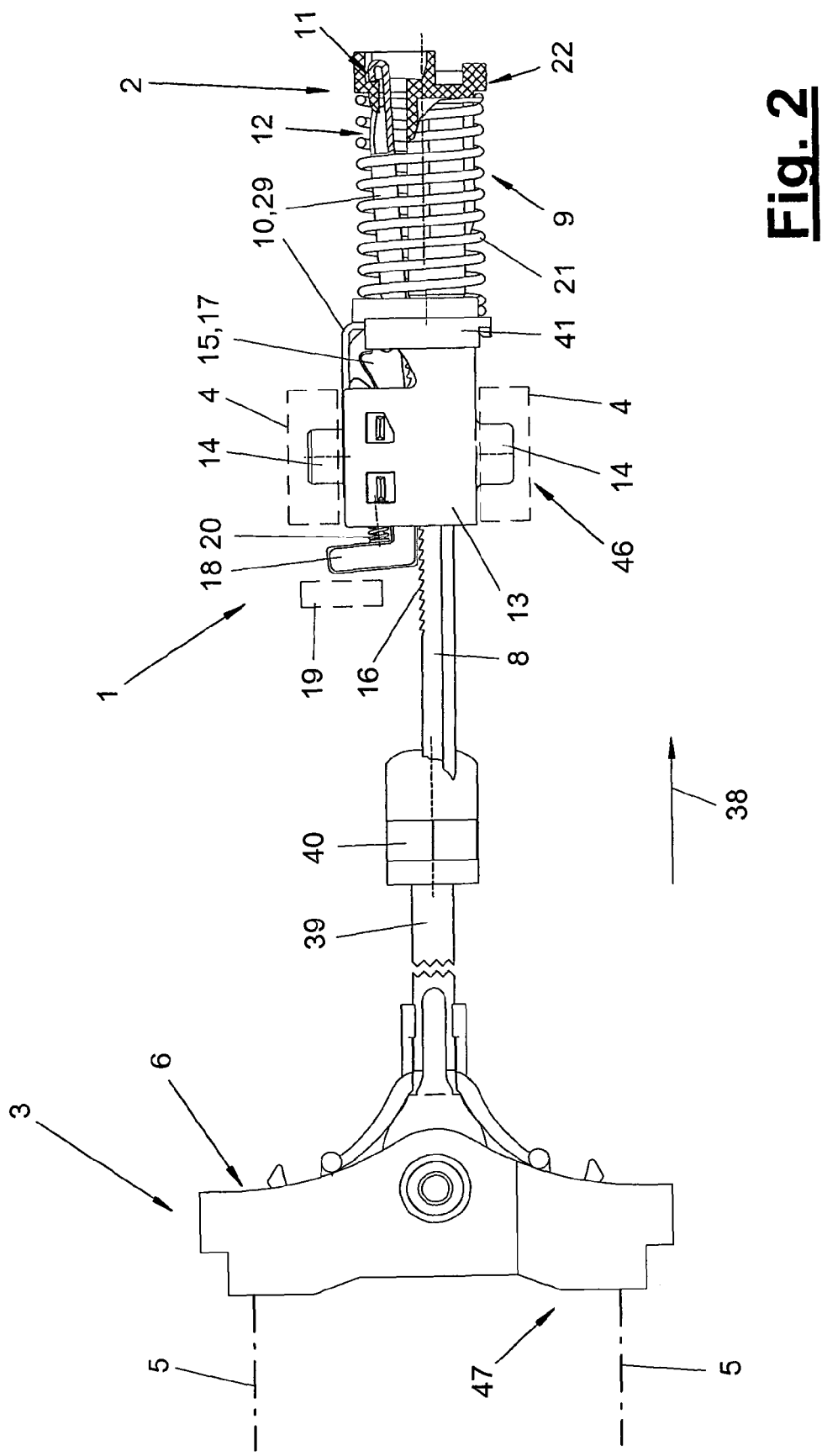
FIG. 2 is a top view of the arrangement according to FIG. 1.
Figure 3:
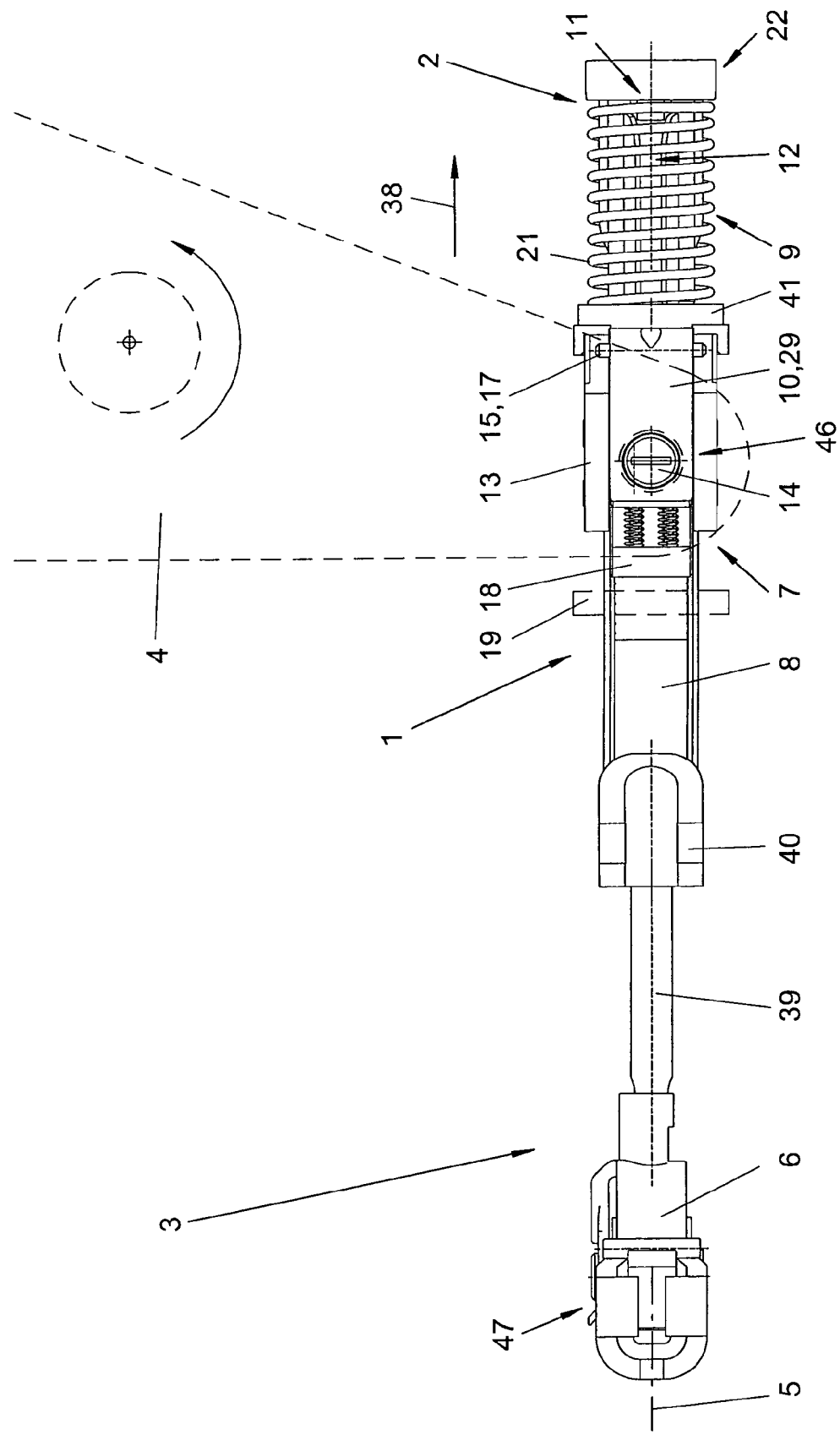
FIG. 3 is a tilted side view of the arrangement according to FIG. 2 with a hand brake lever shown.
Figure 4:
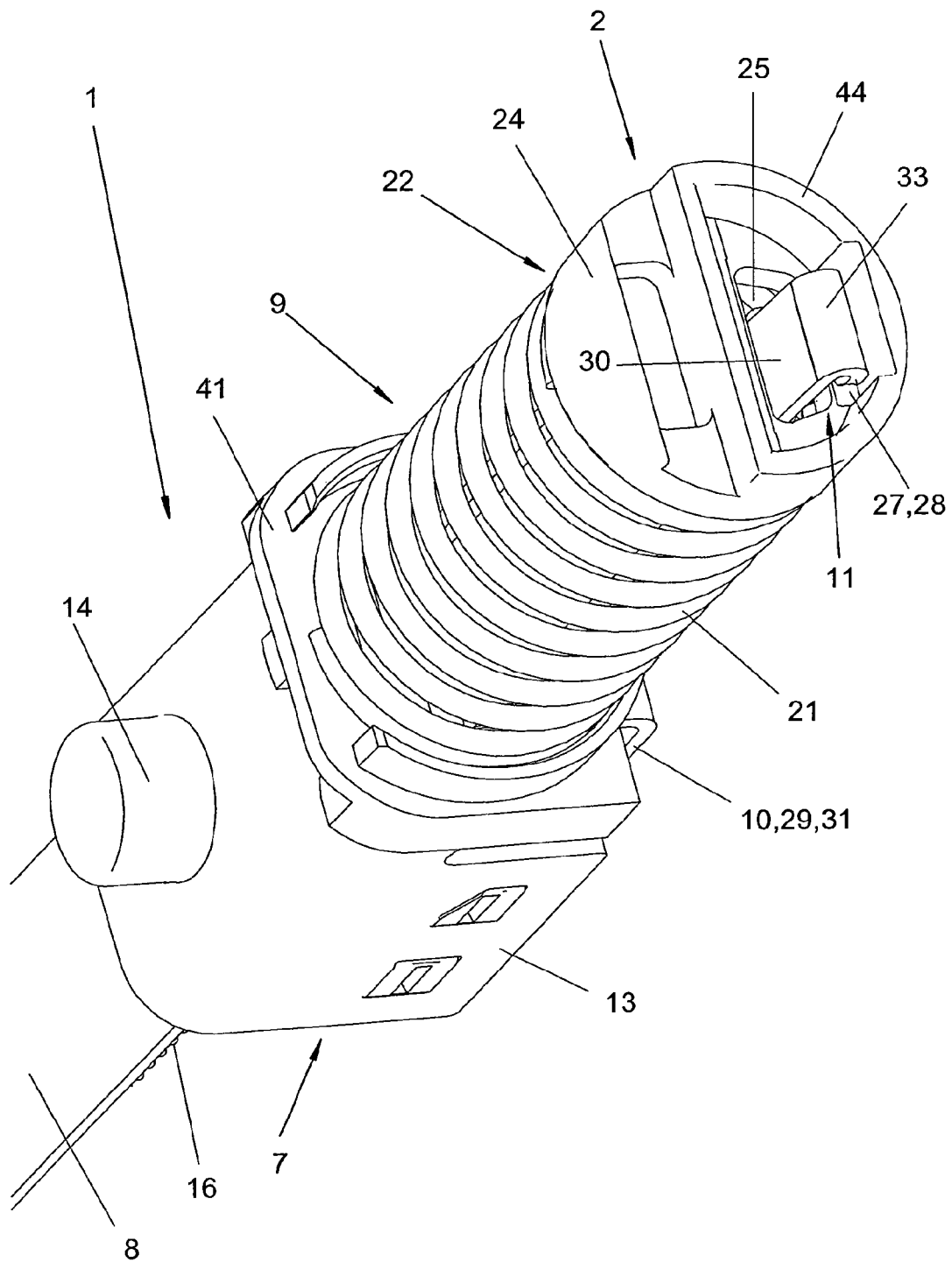
FIG. 4 is an enlarged and cut-away detail view of the mounting aid and of the sheathed cable adjusting means in a perspective view corresponding to FIG. 1.

FIGS. 1 through 3 show a sheathed cable adjusting means 1 and a mounting aid 2 in different views and in conjunction with other components of a brake means 3. Brake means 3 is intended for a vehicle, especially a passenger car or truck. It may be designed, e.g., as a hand brake means and specifically as a parking brake. As an alternative, it may be a service brake.

The brake means 3 has one or more sheathed cables or brake cables 5, which are directly or indirectly connected to one or more wheel brakes not shown. The sheathed cables 5 shown schematically by their axes in the drawings are present as duplicates in the exemplary embodiment being shown and are connected with a compensating element 6, which is designed, e.g., as a balance arm 6. Balance arm 6 is pivotably connected via a first hinge to a connection member 39, e.g., a connection rod, which is in turn connected via a second hinge 40 with a pulling element 8 of the sheathed cable adjusting means 1. As an alternative, only a single sheathed cable 5 may be present and connected directly to the pulling element 8.

Pulling element 8 may have any desired and suitable design. It may be, e.g., a flat connecting rod with a hammer head-like cross section and with teeth, a wave profile or the like of another contour on one or more sides. As an alternative, the connecting rod may have a cylindrical, oval or another cross section.

Furthermore, at least one mobile actuating member 4, which is designed, e.g., as a rotatable hand brake lever and is schematically shown in FIGS. 2 and 3, belongs to the brake means 3. As an alternative, actuating member 4 may be a pedal or brake pedal or another actuating or adjusting member. If the hand brake lever or foot brake lever 4 is rotated about its pivot bearing in the manner indicated by the arrow in FIG. 3, the sheathed cables 5 are tensioned in the tensioning direction 38.

Actuating member 4 acts on the pulling element 8 via a carrying means 7 and a tensioning element 9. There may be a releasable connection between the carrying means 7 and the pulling element 8. There likewise is a connection, which is preferably permanent, between the tensioning element 9 and the pulling element 8. With the carrying means 7 released, tensioning element 9 pulls the pulling element 8 and tensions the sheathed cables 5 as a result, and any lengthening in the sheathed cables 5 or wear on the wheel brakes or other external effects can be now be compensated. This compensation is reversible due to the released carrying means 7.

The carrying means 7 and the pulling element 9 may have any desired and suitable design. The tensioning element 9 may be connected to the carrying means 7 and supported at this. Tensioning element 9 may be arranged in front of the carrying means 7 in the direction of pull 38. As an alternative, tensioning element 9 may be arranged behind the carrying means 7. It may, furthermore, be supported at the actuating member 4 or at another site, e.g., at a stationary stop or the like. Carrying means 7 and tensioning element 9 together form said sheathed cable adjusting means 1. This may be designed, e.g., according to DE 20 2004 005 247 U1 or in another suitable manner.

A mounting aid 2 is used for mounting the sheathed cable adjusting means 1 and possibly also the sheathed cables 5 and the other parts of the brake means 3. The sheathed cable adjusting means 1 can be temporarily bridged over or relieved with the mounting aid 2. The sheathed cable adjusting means 1 is located between the actuating member 4 and the sheathed cables 5 and establishes an adjustable and tensionable connection between these. The sheathed cable adjusting means 1 has for this, on the one hand, a connection site 46 for the actuating member 4, which is formed, e.g., in the manner to be explained below by a bearing 14 of a clamping housing 13 and, on the other hand, a connection site 47 for the sheathed cables 5, which is formed, e.g., by the connection of the element 6 with the pulling element 8 or by a direct connection of a sheathed cable 5 with the pulling element 8. The sheathed cable adjusting means 1 defines the distance between these two connection sites 46, 47 and can also change, especially shorten this when needed by acting on the tensioning element 9 to correspondingly tension the sheathed cables 5 and to take up the slack in the sheathed cables 5 or in other areas of the brake means 3, e.g., in the wheel brakes.

During mounting, the sheathed cable adjusting means 1 is connected to the actuating member 4 and the one or more sheathed cables 5 at said connection sites 46, 47. It is favorable for this if the distance between these connection sites 46, 47 is fixed at the sheathed cable adjusting means 1 and the tensioning element 9 is deactivated or blocked for this, and the fixed distance is maintained for the duration of the mounting. The sheathed cable adjusting means 1 bridged over or relieved temporarily can be handled during the mounting like a rigid connection rod. It is, furthermore, favorable if this distance is greater than during the normal travel and braking operation. This purpose is served by the mounting aid 2, which ensures said bridging over or relief of the sheathed cable adjusting means 1 and the tensioning function thereof.

Mounting aid 2 cooperates with the sheathed cable adjusting means 1 and can lock this in a position suitable for mounting at a sufficiently great distance of the connection sites 46, 47. Mounting aid 2 has a securing element 10 for this, which acts on the tensioning element 9 and detachably locks this in a partially tensioned position. As a result, the pulling element 8 connected to the tensioning element 9 is locked as well. It is now pushed out of the sheathed cable adjusting means 1 or the carrying means 7 towards the compensating element 6 to the extent that the sheathed cables 5 can be suspended without problems. The sheathed cables 5 may be suspended at the compensating element 6 and/or at the wheel brakes.

After completion of the mounting, the mounting aid 2 can be released and the locked sheathed cable adjusting means 1 can again be released. This may be carried out by a tensioning or tightening motion of the actuating member 4 in the tensioning direction 38 and/or a retracting motion of the pulling element 8, e.g., by pulling on the sheathed cable 5 or on the compensating element 6 in the opposite direction, while release of the locking mechanism takes place automatically. The at first partially tensioned tensioning element 9 is tensioned even more in all cases of motion, as a result of which the locking mechanism is released and can become released. The carrying means 7 is released for this or has an at least limited mobility and permits a relative motion between the actuating member 4 and the pulling element 8. This may be especially a relative motion of the clamping housing 13 in relation to the pulling element 8 fixed by the sheathed cable 5.

The carrying means 7 may be released in various manners. On the one hand, the actuating member 4, e.g., the hand brake lever, can be brought into a released position or 0 position, as a result of which the carrying means 7 is opened in the manner explained below. The actuating member 4 can be tightened starting from this position, while the tensioning element 9 is tensioned and the mounting aid 2 is released before the carrying means 7 snaps in again and establishes a fixed connection between the pulling element 8 and the actuating member 4. As an alternative or in addition, a sheathed cable 5 or the compensating element 6 can be pulled in the rearward direction against the direction of tensioning 38 in said released position or 0 position, while the pulling element 8 is moved along and tensions the tensioning element 9 supported at the carrying means 7. As an alternative, the pulling element 8 can be pulled directly as well. A relative motion takes place in all cases between the pulling element 8 and the part of the carrying means 7 being moved by the actuating member 4, e.g., the clamping housing 13 explained below, with which the tensioning element 9 is compressed and leads to release of the mounting aid 2.

It is favorable for the rapid and simple release of the mounting aid 2 to design the locking mechanism as a pretensioned snap-in connection 11 and to arrange this between the securing element 10 and the tensioning element 9. The snap-in connection 11 is released due to the mutual relative motion of the securing element 10 and the tensioning element 9, and the pretensioned securing element 10 springs back and assumes a locking-free resting position, which does not interfere with the further operation of the sheathed cable adjusting means 1 and the braking means 3. The tensioning element 9 freed from the locking mechanism can become released and carries the pulling element 8, as a result of which the sheathed cables 5 are tensioned and are set into a starting position.

As an alternative, a mechanical restricted guidance may be present instead of the snap-in connection 11 in order to release the locking mechanism during the relative motion and to detach the securing element 10 from the tensioning element 9 and to bring it into a locking-free resting position.

The mounting aid 2 is used for the initial mounting of the actuating member 4 in the vehicle. The sheathed cable adjusting means 1 and its carrying means 7 can be bridged over such that the actuating member 4 can be brought into a position favorable for mounting, e.g., into an oblique position or into an upright position. The actuating member 4 may also assume a turned-down resting position. The pulling element 8 is pushed out to the rear and its engagement with the carrying means 7 is released. After completion of the mounting of the actuating member 4 and its other components, e.g., a frame with a locking means, a supporting gas spring or the like, e.g., the actuating member 4 is pushed beyond the mounting position, and the tensioning element 9 is tensioned even more in the direction of tensioning 38 and the locking mechanism or the snap-in connection 11 can become released in the above-mentioned manner. The actuating member 4 is subsequently moved back into the resting position.

The mounting aid 2 may have, furthermore, a guide means 12 for guiding the securing element 10 during the release of the locking mechanism or the snap-in connection 11. The guide means 12 may also act as a securing means against an undesired repeated snapping in of the locking mechanism or of the snap-in connection 11 and may have a corresponding design. It may, furthermore, be a part of the above-mentioned restricted guidance. As an alternative, guide means 12 may be dispensed with in case of a sufficient snap-back function.

Guide means 12 can bring the securing element 10 into a neutral position, in which it does not interfere with the operation of the sheathed cable adjusting means 1 and the brake means 3, does not develop any braking frictional forces and also does not become blockingly meshed with the tensioning element 9 any more.

Securing element 10 is connected to the carrying means 7 in the embodiment being shown. As an alternative or in addition, it may be connected directly to the actuating member 4. It is favorable for creating the pretensioned snap-in connection 11 if the securing element 10 is made flexurally elastic at least in some areas. This makes it possible for the securing element 10 to snap back into said neutral position after releasing the locking mechanism or the snap-in connection 21. As an alternative or in addition, this return motion may be supported by the guide means 12. In a variant of the embodiment being shown, the locking mechanism may be released only by the guide means 12, in which case an elastically pretensioned snap-in connection 11 can be done away with.

FIGS. 1 through 13 show an exemplary embodiment of the design of the sheathed cable adjusting means 1, mounting aid 2 and carrying means 7 in conjunction with a hand brake means 3 of a vehicle. The sheathed cable adjusting means 1 and carrying means 7 may be designed corresponding to DE 20 2004 005 247 U1.

Carrying means 7 has a hollow clamping housing 13 with a clamping piece 15 guided movably therein in the direction of insertion 38 and at right angles thereto with a wedge guide 17. The rod-shaped pulling element 8 passes through the clamping housing 13 and is guided therein in a positive-locking manner and movably in the longitudinal direction. Pulling element 8 cooperates with clamping piece 15 via a detachable locking mechanism 16. Locking mechanism 16 is formed, e.g., from toothed racks, bicurve sections or the like at the connecting rod 8 and on the side of the clamping piece 15 facing it.

Clamping housing 13 is connected to the arms of the hand brake lever 4 on both sides via a bearing 14, e.g., two laterally projecting bearing bolts. Clamping housing 13 may be mounted between these arms. Rotary motions of the hand brake lever 4 are converted into a carrying motion of clamping housing 13 in the insertion direction 38. Clamping piece 15 is brought close to pulling element 8 via wedge guide 17 and locking mechanism 16 is closed in the process. This brings about carrying of pulling element 8 in the tensioning direction 38.

Clamping piece 15 projects on the rear side from clamping housing 13 and is provided there with a boss projecting away, on which one or more springs 20 act, which are supported at clamping housing 13. Clamping piece 15 is moved against the insertion direction 38 by this spring force, as a result of which the head of clamping piece 15, which head is thickened in a wedge-shaped manner, will mesh with a wedge surface on clamping housing 13 and the wedge guide 17 formed hereby presses clamping piece 15 towards the connecting rod 8. This carrier meshing and the locking mechanism 16 are released in the resting position of actuating member 4 by boss 18 striking a relatively stationary stop 19 and clamping piece 15 being pushed forward in the insertion direction 38 and being moved away from pulling element 8 while the wedge connection 17 is released. Tensioning element 9 acts on pulling element 8 in this released position and can tighten this while compensating the brake wear, stretching of the sheathed cable or the like.

The position and length of the locking mechanism 16 can be defined and coordinated with the mounting needs. The extension of the toothed rack or of the bicurve section may be limited, especially at pulling element 8 in the forward direction in the insertion direction 38, pulling element 8 further, having a neutral and, e.g., essentially smooth or unprofiled area. Pulling element 8 is pushed out to the rear against the insertion direction 38 in the partially tensioned relieved or bridged-over position of tensioning element 9, and this neutral or unprofiled area reaches the clamping piece 15 and prevents the locking mechanism 16 from closing. The actuating member 4 can be brought in this position into a position that is favorable for mounting without closing of the locking mechanism 16 taking place due to this motion.

The unprofiled area facilitates, moreover, the above-mentioned further tensioning of the tensioning element 9 with the sheathed cables 5 suspended and with the wheel brakes pulled completely, which together limit a further motion of pulling element 8 in the insertion direction 38 in this position and offer the necessary support for the further tensioning of tensioning element 9. The carrying means 7 with the clamping piece 15 can move further in relation to the pulling element 8 during this further tensioning motion without a locking meshing. It is only after releasing the mounting aid 2 and the return motion of the actuating member 4 into the resting position that the toothed racks, bicurve sections or the like are brought by the connecting rod 8 and the clamping piece 15 into a relative position that is favorable for meshing.

If such a coordination of the locking mechanism 16 and especially a neutral area on the pulling element 8 is used, the mounting aid 2 can be released by tightening the actuating member 4 and/or by tightening the pulling element 8 directly from the mounting position of actuating member 4. A return motion into the released position or 0 position thereof is not necessary. In addition, it is irrelevant whether the sheathed cables 5 have length tolerances.

As an alternative, the locking mechanism 16 may extend up to the front end of pulling element 8. If the actuating member 4 is in the resting position, locking mechanism 16 is opened. With the sheathed cables 5 suspended and blocked, a very short tensioning path of carrying means 7 and of tensioning element 9 by the tensioning motion of the actuating member 4 and/or of pulling element 8, which motion was mentioned in the introduction, is sufficient. The tensioning path is shorter than the adjustment path for clamping piece 15 for closing the locking mechanism 16, so that secure release of the locking mechanism is ensured in this variant as well.

In the embodiment shown, tensioning element 9 has a hollow tension spring 21, which is designed, e.g., as a cylindrical compression coil spring and is arranged in front of carrying means 7 in the tensioning direction 38. This tension spring 21 is supported on the rear side at clamping housing 13. A suitable spring mount 41 with a ring-shaped guide ring according to FIGS. 1 and 4 may be present for this on the front side of clamping housing 13. Spring mount 41 may have a free space for the passage of securing element 10. As an alternative, it may be connected to securing element 10 and form a part thereof. Spring mount 41 may have lateral cheeks for positive-locking guiding and support at clamping housing 13.

Figure 5:
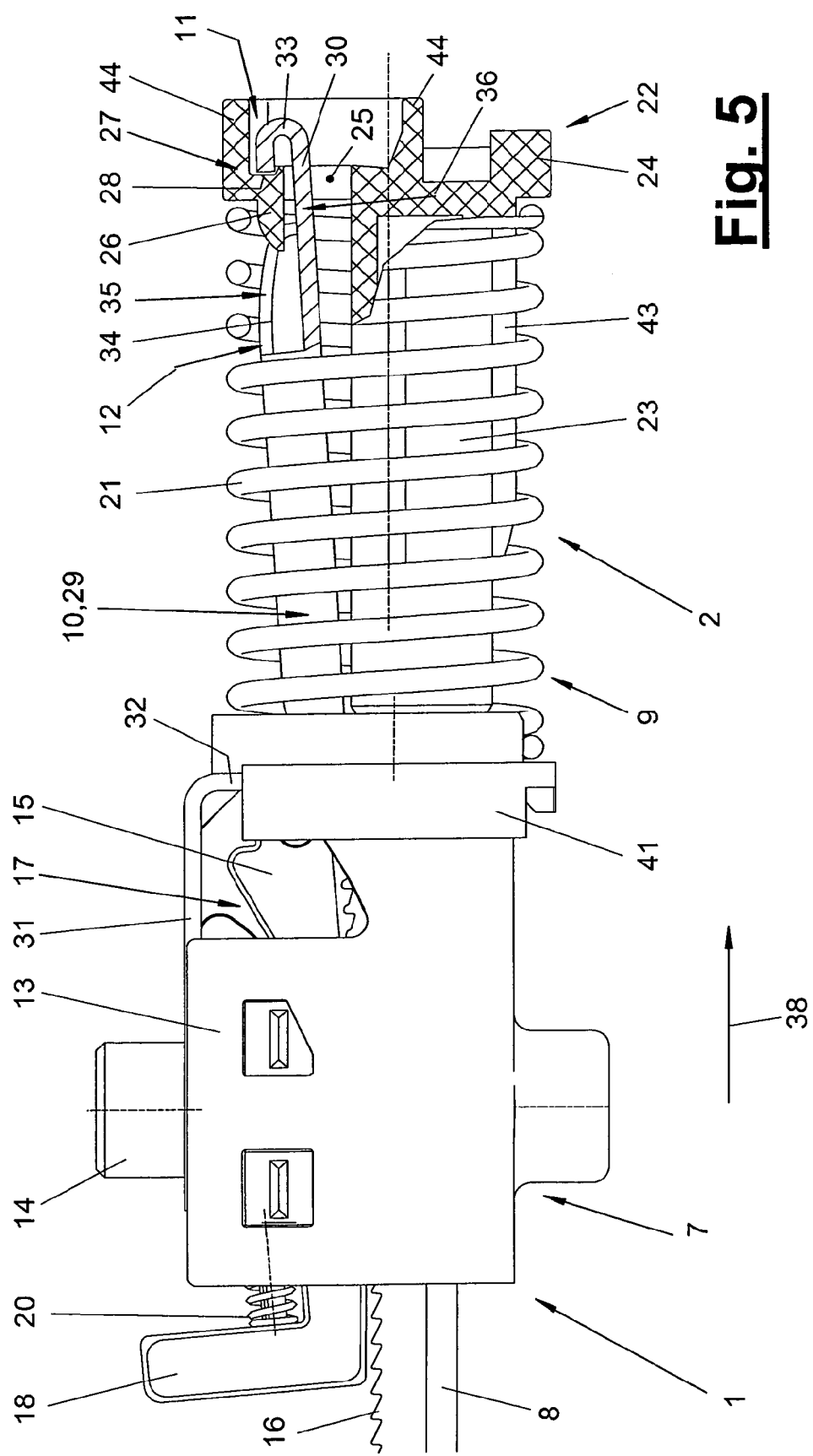
FIG. 5 is an enlarged cut-away and partially cut side view of the sheathed cable adjusting means and of the mounting aid according to FIG. 2.
Figure 6:
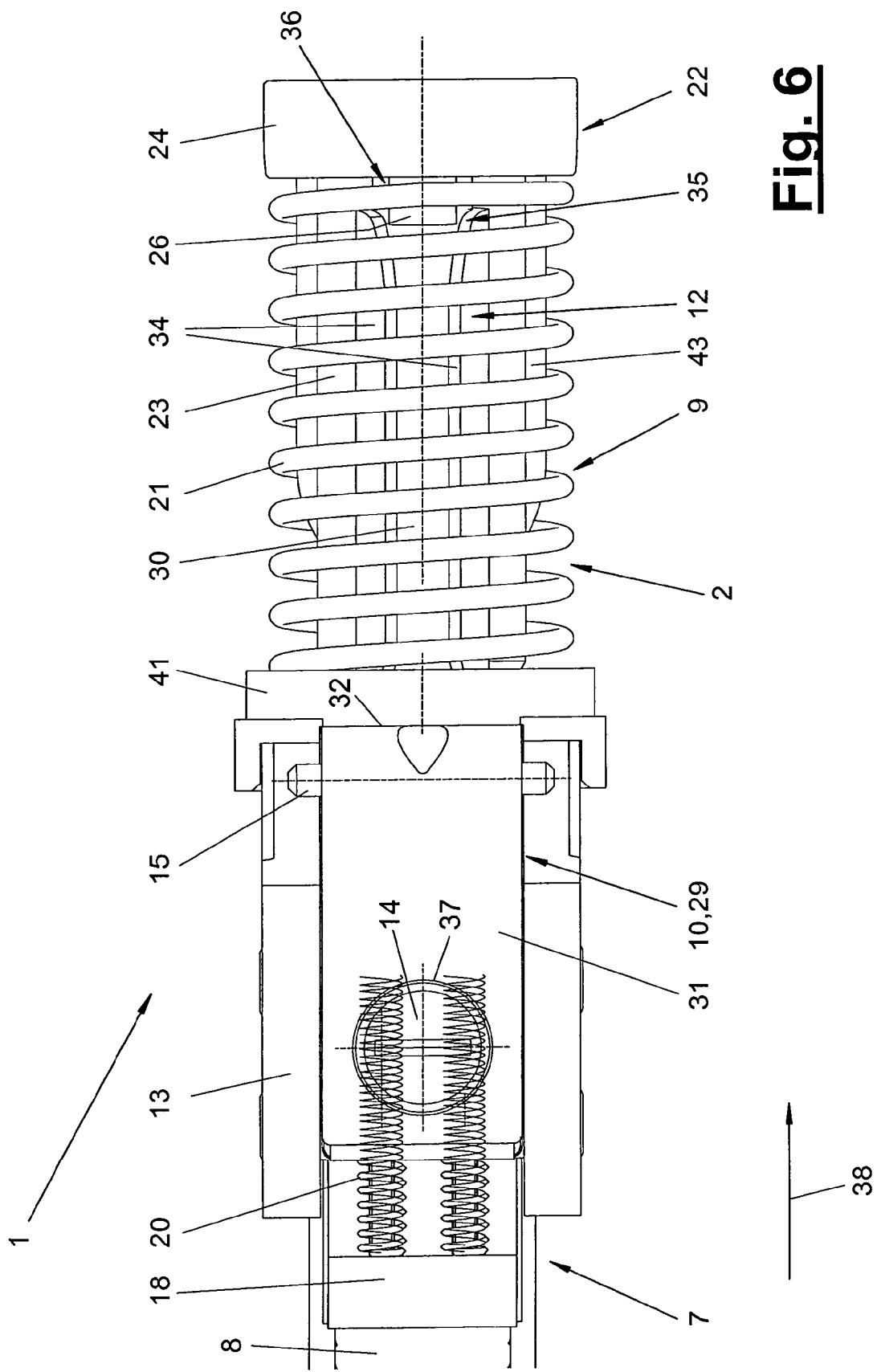
FIG. 6 is an enlarged and cut-away detail view of the sheathed cable adjusting means and of the mounting aid according to FIG. 3.
Figure 11:
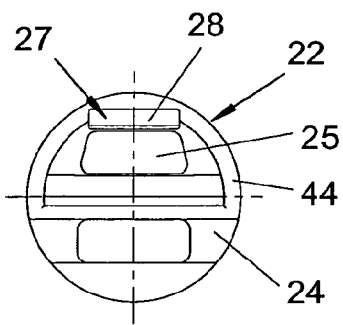
FIG. 11 is an end view of a spring support.
Figure 10:
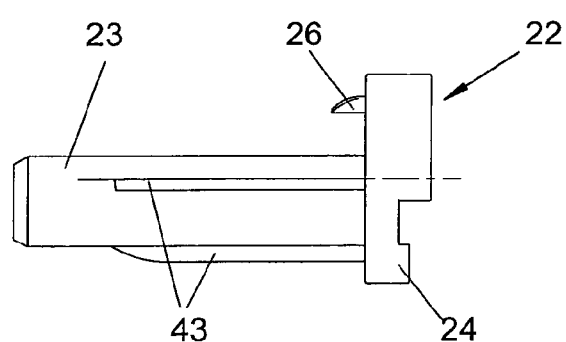
FIG. 10 is a side view of a spring support.
Figure 12:
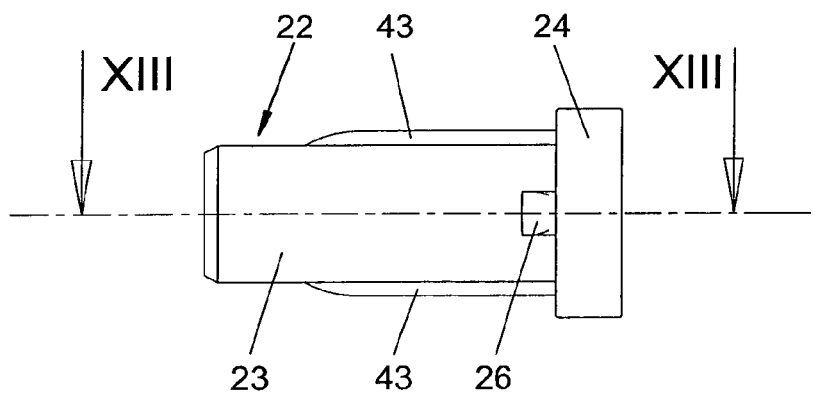
FIG. 12 is a top view of a spring support.
Figure 13:
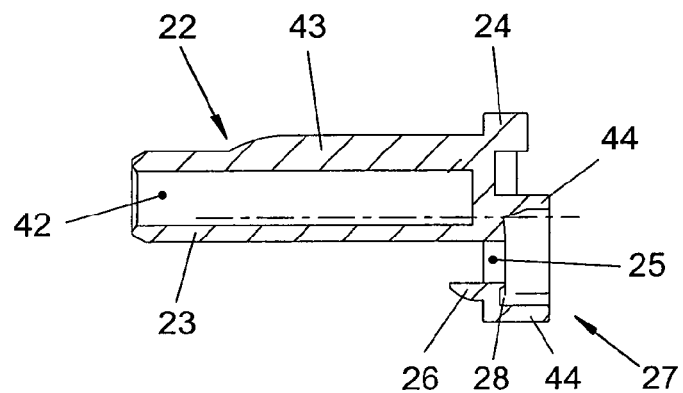
FIG. 13 is a partially cut away view of a spring support.

At the front end, tensioning element 9 has a spring support 22 shown in FIGS. 10 through 13, which supports and guides the front end of tension spring 21, on the one hand, and is connected to pulling element 8 in a non-positive or positive-locking manner and carries same, on the other hand. Spring support 22 may have for this a shell- or pin-shaped mount 23 with a hollow space 42 for pulling element 8, which said mount extends through the hollow interior space of tension spring 21 and still leaves a free space for securing element 10 on the top side. FIG. 5 shows this arrangement in a larger view. Mount 23 may also have longitudinally extending lateral guide ribs 43 for tension spring 21 according to FIGS. 10 through 13.

Spring support 22 has, furthermore, a front-side support element 24, which is designed, e.g., as a round support plate. This [support plate] has guide bosses or the like on the rear side for supporting and guiding the tension spring 21, with which it is in contact. In addition, a guide tongue 26, which projects towards clamping housing 13, is formed, e.g., as a boss made integrally in one piece and cooperates with guide means 12 and securing element 10, is arranged here. Guide tongue 26 may be used, besides, for guiding the spring. Spring support 22 may be a shaped or cast part made of metal.

Support element 24 has, besides, a passage opening 25, through which securing element 10 can extend and move. On the outside and in the vicinity of opening 25, support element 24 has a bracket 27 for securing element 10, which said bracket is used to form the locking mechanism or snap-in connection 11. As is illustrated in sectional views in FIGS. 5 and 13, bracket 27 may be designed as a front-side locking groove 28, which may possibly have an oblique groove wall adjacent to opening 25 for easier release and opening of the snap-in connection 11. Support element 24 may have, besides, walls, which project in the forward direction in a pot-shaped manner around opening 25 and which protectingly surround opening 25 as well as securing element 10 and prevent premature opening of the locking or snap-in connection 11, which is closed by the manufacturer, by external effects.

Securing element 10 is made of a suitable material, e.g., metal or plastic, as a bent, flexurally elastic and straight-legged securing strap 29 in the exemplary embodiment being shown and is shown in perspective views and in tilted views in FIGS. 7 through 9.

Securing strap 29 has a rear leg 31, which can be connected to clamping housing 13 by means of a housing mount 37. Housing mount 37 may be, e.g., a round mount or passage opening, with which leg 31 can be attached to a mounting pin 14 and is flatly in contact with the side wall of housing 13.

Securing strap 29 has a transversely projecting intermediate leg 32, which may be in contact with the front wall of clamping housing 13 and possibly extend through the free space of spring mount 41. It is pressed by tension spring 21 via spring mount 41 onto the housing wall and fixed. Rear leg 31 and intermediate leg 32 may have a flat strip or plate shape.

Securing strap 29, which is bent twice and in an approximately Z-shaped pattern, has, besides, a straight, front leg 30, which adjoins intermediate leg 32 on the rear side. A bilateral reduction 45 may be present at the bending and transition site. Leg 30 extends through the interior space of tension spring 21 and carries at the front end a securing boss 33, which is curved in a hook-shaped manner, points away from mount 23 and may mesh with bracket 27 or locking groove 28.

Front leg 30 is bent obliquely upward in the locking position according to FIGS. 2 and 5 and develops a restoring spring force as a result after releasing the snap-in connection 11. The spring action is defined by the fixation of the position of intermediate leg 32 and of the bending site in relation to leg 30 at clamping housing 13. Leg 30 may have a spring force-increasing, slight bend in the opposite direction in the untensioned initial form according to FIG. 8.

In addition, guide means 12 is arranged at the front leg 30. It comprises, e.g., one or two lateral strap walls or leg walls 34, which project from the flat leg web and are in turn bent obliquely in relation to the leg center and have another bevel at the front end. Strap walls 34 stabilize the front leg 30 against the compressive forces occurring during the release of the locking as well as against kinking and support the spring action. Securing boss 33 and guide means 12 are located on the same side of securing strap 29, the height of the strap walls 34 being able to be equal to or greater than the bent-back securing boss 33. Strap walls 34 may slide on the tension spring 21 in case of possible incorrect positions of leg 30 and prevent securing boss 33 from becoming hooked into the spring turns. Securing boss 33 may have rounded or lateral edges or lateral edges tapering in a wedge-shaped pattern on the front side, which likewise prevent an undesired hooking in and, on the other hand, facilitate the opening of the snap-in connection 11.

Furthermore, the strap walls 34 may form a guide slope 35 on the front side, which is tapered in a funnel-shaped manner and cooperates with the boss or guide tongue 26 at support element 24. Securing boss 33 is arranged at a spaced location in front of the end of the strap walls 34 while forming a free space 36. Guide tongue 26 protrudes into this free space 36.

As is illustrated in FIG. 5, front leg 30 protrudes through opening 25 in the locked position, the securing boss 33 bent back by 180° meshes with the locking groove 28 and prevents the pretensioned tension spring 2 from being released. When the actuating member 4 is still moved further from this locked position and carrying means 7 is moved further as a result with the securing strap 29 in the insertion direction 38, securing boss 33 moves out of locking groove 28 and front leg 30 springs back from the tensioned oblique position into the longitudinally directed neutral position. Leg 30 floats in the neutral position with its flat underside over mount 23 or is in contact here with a minimal force only. As a result, securing strap 29 does not brake or reduce the force of tensioning element 9 during the wear compensation.

The return motion of leg 30 can be supported by the guide means 12, and the guide slope 35 slides at the guide tongue during the relative motion between the securing strap 29 and the support element 24 fixed by pulling element 8 and pushes 30 away.

When actuating member 4 and carrying means 7 assume the resting and stop position and locking mechanism 16 is released, tension spring 21 may relax while carrying pulling element 8 with it. It now pushes support element 24 in the insertion direction 38 over and beyond the securing strap 29 located in the neutral position, and the front end of the strap dips with the securing boss 33 through opening 25 and comes into the area of the tension spring. The front leg 30 can be slidingly in contact with the unprofiled front end of pulling element 8 in the neutral position and does not hinder the compensating motions of tension spring 21 and of pulling element 8. Securing boss 33, which is bent to a shape favorable for sliding, can be held in the neutral position by the flat underside of guide tongue 26, which said underside is flush with the edge of the opening.

Various modifications of the embodiments shown and described are possible. The carrying means 7 may have a different design, in which case, e.g., connecting rod 8 has a cylindrical shape with a bicurve section on the outside and clamping piece 15 comprises a plurality of wedge-shaped ring segments around connecting rod 8 with a bicurve section on the inside. Furthermore, tensioning element 9 may be arranged at another location of the sheathed cable adjusting means 1 and have a different design. This also applies to the securing element 10. Instead of the oblique strap walls 34, an upwardly projecting middle web may be present. Locking boss 33 may also have another shape and arrangement.

While specific embodiments of the invention have been described in detail to illustrate the application of the principles of the invention, it will be understood that the invention may be embodied otherwise without departing from such principles.

The invention claimed is:

1. A sheathed cable adjusting device comprising:
a pulling element for connection to a sheathed cable;
a carrying means, which can be connected to an actuating member, for detachably carrying the pulling element;
a tensioning element acting between the carrying means and the pulling element, the tensioning element having a hollow tension spring supported on the carrying means and a mount for the pulling element, the tensioning element having a support element for the tension spring; and
a mounting aid, comprising a securing element, which locks the tensioning element in a partially tensioned position and automatically releases the tensioning element by a motion of the actuating member and/or of the pulling element, the mounting aid comprising a pretensioned snap-in connection between the securing element and the tensioning element, and a guide means for guiding the securing element during the release of the snap-in connection, the support element having an opening for the passage of the securing element and a locking groove located on the outside for mounting a securing boss of the securing element, wherein the support element has a guide tongue cooperating with the guide means during a relative motion, between the guide means and the guide tongue, to release the snap-in-connection and for securing against the repeated locking thereof.

2. A sheathed cable adjusting device in accordance with claim 1, wherein the carrying means has a clamping housing with a clamping piece guided movably therein with a wedge guide.

* * * * *